United States Patent
Magno et al.

(10) Patent No.: US 6,521,566 B1
(45) Date of Patent: Feb. 18, 2003

(54) MIXED OXIDE SOLID SOLUTIONS

(75) Inventors: Scott Magno, Dublin, CA (US); Ruiping Wang, Fremont, CA (US); Eric Derouane, Liverpool (GB)

(73) Assignee: Catalytica Energy Systems, Inc., Mountain View, CA (US)

( * ) Notice: Subject to any disclaimer, the term of this patent is extended or adjusted under 35 U.S.C. 154(b) by 0 days.

(21) Appl. No.: 09/680,547

(22) Filed: Oct. 4, 2000

(51) Int. Cl.$^7$ .......................... B01J 23/00; B01J 23/40; B01J 23/42; B01J 23/56; B01J 23/44
(52) U.S. Cl. .................. 502/325; 502/326; 502/327; 502/332; 502/333; 502/339; 502/439
(58) Field of Search ................ 502/325, 326, 502/327, 332, 333, 339, 439, 527.11, 527.12, 527.15; 252/186.33

(56) References Cited

U.S. PATENT DOCUMENTS

| | | |
|---|---|---|
| 3,969,082 A | 7/1976 | Cairns et al. |
| 4,189,405 A * | 2/1980 | Knapton et al. ............ 252/462 |
| 4,331,631 A | 5/1982 | Chapman et al. |
| 4,414,023 A | 11/1983 | Aggen et al. |
| 4,636,248 A | 1/1987 | Ogata et al. |
| 4,861,747 A | 8/1989 | Wachs et al. |
| 5,112,433 A | 5/1992 | Dawson et al. |
| 5,183,401 A | 2/1993 | Dalla Betta et al. |
| 5,232,357 A | 8/1993 | Dalla Betta et al. |
| 5,248,349 A | 9/1993 | Foote et al. |
| 5,259,754 A | 11/1993 | Dalla Betta et al. |
| 5,326,253 A | 7/1994 | Dalla Betta et al. |
| 5,405,260 A | 4/1995 | Dalla Betta et al. |
| 5,420,081 A | 5/1995 | Mattes et al. |
| 5,496,788 A * | 3/1996 | Domesle et al. ............ 502/333 |
| 5,511,972 A | 4/1996 | Dalla Betta et al. |
| 5,518,697 A | 5/1996 | Dalla Betta et al. |
| 5,607,892 A | 3/1997 | Chopin et al. |
| 5,720,931 A | 2/1998 | Rossin et al. |
| 5,851,950 A | 12/1998 | Rossin et al. |
| 5,945,369 A | 8/1999 | Kimura et al. |
| 5,958,829 A * | 9/1999 | Domesle et al. ............ 502/333 |

FOREIGN PATENT DOCUMENTS

| | | |
|---|---|---|
| EP | 0 527 634 A1 | 2/1993 |
| JP | 358002220 A | 1/1983 |
| JP | 359073431 A | 4/1984 |
| JP | 361053114 A | 3/1986 |
| JP | 361053115 A | 3/1986 |
| JP | 361275108 A | 12/1986 |
| JP | 405306122 A | 11/1993 |

OTHER PUBLICATIONS

Gritzner and Puchner, "$V_2O_5$, $Nb_2O_5$ and $Ta_2O_5$ Doped Zirconia Ceramics," *J. European Ceramic Society* (1994) 13: 387–394.

(List continued on next page.)

*Primary Examiner*—Stanley S. Silverman
*Assistant Examiner*—Cam N. Nguyen
(74) *Attorney, Agent, or Firm*—Morrison & Foerster LLP

(57) ABSTRACT

The present invention is a mixed oxide solid solution containing a tetravalent and a pentavalent cation that can be used as a support for a metal combustion catalyst. The invention is furthermore a combustion catalyst containing the mixed oxide solid solution and a method of making the mixed oxide solid solution. The tetravalent cation is zirconium(+4), hafnium(+4) or thorium(+4). In one embodiment, the pentavalent cation is tantalum(+5), niobium(+5) or bismuth(+5). Mixed oxide solid solutions of the present invention exhibit enhanced thermal stability, maintaining relatively high surface areas at high temperatures in the presence of water vapor.

16 Claims, 7 Drawing Sheets

OTHER PUBLICATIONS

Grins et al., "Phases in the $Zr_xTa_{1-x}(O,N)_y$ system, formed by ammonolysis of Zr–Ta gels: Preparation of a Baddeleyite–type solid solution phase $Zr_xTa_{1-x}O_{1+x}N_{1-x}, 0 \leq X \leq 1$," *J. Mater. Chem.*(1994) 4(8): 1293–1301.

Mercera et al., "Zirconia as a support for catalysts; Influence of additives on the thermal stability of the porous texture of monoclinic ziconia," *Applied Catalysis* (1991) 71: 363–391.

Turlier et al., "Non–porous stabilized $ZrO_2$ particles as support for catalysts," *Applied Catalysis* (1987) 29: 305–310.

Pissenberger and Gritzner, "Preparation and properties of noibia– and tantala–doped orthorhombic zirconia," *J. Materials Science Letters* (1995) 14: 1580–1582.

Zheng and West, "Compound and solid–solution formation, phase equilibria and electrical properties in the ceramic system $ZrO_2$–$La_2O_3$–$Ta_2O_5$," *J. Mater. Chem.* (1991) 1(2): 163–167.

* cited by examiner

MIXED OXIDE SOLID SOLUTIONS

STATEMENT AS TO RIGHTS TO INVENTIONS MADE UNDER FEDERALLY SPONSORED RESEARCH AND DEVELOPMENT

The US Government may have certain rights in this invention pursuant to CRADA No. TSB-841-94 and U.S. Department of Energy Contract No. W-7405-eng-48.

FIELD OF THE INVENTION

The present invention is a mixed oxide solid solution containing a tetravalent and a pentavalent cation that can be used as a support for a metal combustion catalyst. The invention is furthermore a combustion catalyst containing the mixed oxide solid solution and a method of making the mixed oxide solid solution.

BACKGROUND OF THE INVENTION

Combustion processes oftentimes produce a variety of environmental pollutants. The pollutants may be created due to the presence of a contaminant in a fuel source or due to an imperfect combustion process. In either event, the treatment of combustion products with certain types of catalytic combustion technologies can substantially reduce the entry of combustion created pollutants into the environment.

One type of catalytic combustion technology is the XONON® catalyst unit, which is a proprietary product of Catalytica Combustion Systems, Inc. This catalyst unit possesses a number of advantages over other combustion catalyst systems. For instance, its provides for improved temperature control throughout the catalyst structure: both the temperature rise along the length of the structure and the maximum temperature at the catalytic wall are limited. This control allows for an increased lifetime of highly active catalysts that are typically deposited on the walls of a monolithic structure.

The XONON® unit consists of a corrugated metal foil that has been coated with a catalytic layer. The coated foil is wound into a spiral, forming a cylindrical structure with longitudinal passages. The unit configuration, and related variations, are described in a number of U.S. patents, including U.S. Pat. Nos. 5,232,357, 5,259,754, 5,405,260 and 5,518,697.

The catalytic layer coated on the corrugated metal foil typically consists of a catalyst supported by a variety of refractory oxides. Such oxides include alumina, silica, titania and magnesia that may or may not have been doped with a stabilizing agent. U.S. Pat. No. 5,5259,754 ('754 patent) reports the use of zirconia as a support for certain metal catalysts, noting that it is a preferred support for palladium catalysts.

Zirconia is less reactive with transition metals than alumina, rare earth oxides, alkaline earth oxides, titania or silica. This is important since transition metals are the active catalytic component in a variety of combustion processes. A reaction between the catalyst and the support deactivates the catalyst, thereby decreasing the efficiency of the catalyst unit.

Despite the advantage offered by zirconia, it is not a commercially acceptable catalyst support material. Catalytic combustion processes produce water vapor and are performed at very high temperatures. Zirconia rapidly sinters in the presence of water vapor at high temperatures. The sintering decreases the surface area of the zirconia, making it substantially less effective as a support for the catalytic component.

Zirconia can be stabilized to sintering and coarsening through the addition of silica oxide. The silica greatly extends the performance and useful operating range of the zirconium based materials. The use of zirconia and silica-zirconia mixed oxides as combustion catalyst supports is discussed in the following U.S. patents: U.S. Pat. No. 5,183,401, U.S. Pat. No. 5,232,357, U.S. Pat. No. 5,248,349, U.S. Pat. No. 5,259,754 and U.S. Pat. No. 5,405,260.

Several studies have been performed to determine the effect of other additives on the thermal properties of zirconium oxide. Mercera et al. reports that the addition of MgO to zirconium oxide slightly improved its thermal stability at 500° C. *Applied Catalysis* (1991) 71, 363–391. It was further reported that the addition of CaO, $Y_2O_3$ and $La_2O_3$ increases the stability of zirconium oxide up to 700° C., but that the surface area of the mixed oxides decreases rapidly above 800° C. Id. Turlier et al. similarly discusses the addition of lanthanum and yttrium to zirconia in an attempt to increase its thermal stability. *Applied Catalysis* (1987) 29, 305–310.

There are also articles that report the addition of tantalum to zirconium oxide. Pissenberger and Gritzner discuss the preparation of tantalum and niobium doped zirconium oxide. *J. Materials Science Letters* (1995) 14, 1580. Gritzner and Puchner report the preparation of vanadium, niobium and tantalum doped zirconia ceramics. *J. European Ceramic Society* (1994) 13, 387–394. The mixed oxides were prepared through the hydrolysis of the corresponding alkoxides and have lower sintering temperatures than zirconium oxide.

There is a need for a metal catalyst support that is stable at high temperatures in the presence of water vapor. Although there are reports of zirconia mixed oxides, none describe the preparation of stable zirconium oxide materials with a surface area above 10 $m^2$/g at temperatures greater than 1000° C. in air plus high concentrations of water vapor. Furthermore, none of the reports describes the preparation of such zirconia mixed oxides starting from molecularly mixed materials.

SUMMARY OF THE INVENTION

The present invention is a mixed oxide solid solution, a process for making the mixed oxide solid solution and a combustion catalyst containing the mixed oxide solid solution.

The mixed oxide solid solution includes a tetravalent cation and a pentavalent cation. The tetravalent cation is zirconium(+4), hafnlium(+4) or thorium(+4). Preferably, it is zirconium (+4). The pentavalent cation is preferably tantalum(+5), niobium(+5) or bismuth(+5). More preferably, the tetravalent cation is tantalum (+5).

The mixed oxide solid solution contains from about 2 mole percent to about 70 mole percent of the pentavalent cation. Preferably, it contains from about 10 mole percent to about 50 mole percent of the pentavalent cation. More preferably, the solid solution contains from about 15 mole percent to about 35 mole percent of the pentavalent cation.

The mixed oxide solid solution has a relatively high surface area at high temperatures in the presence of water vapor. At 1000° C. in air and about 10% water vapor, for example, the solid solution has a surface area of greater than about 10 $m^2$/g. Preferably, the solid solution has a surface area of greater than about 15 $m^2$/g, when heated at 1000° C. in air and about 10% water vapor.

The process for making the mixed oxide solid solution includes the following steps: (1) forming a molecularly uniform hydrous oxide gel; (2) drying the gel under supercritical conditions; and, (3) calcining the dried gel. Preferably, the gel formation step includes the steps of (1) mixing a tetravalent cation alkoxide and a pentavalent cation oxide to form a mixture, and (2) adding a solution comprising an acid, an alcohol and water to the mixture. The supercritical drying step preferably includes the steps of (1)

placing the gel in a reaction chamber, (2) adding a solvent to the gel to form a mixture, and (3) removing the solvent from the mixture above its critical temperature.

The combustion catalyst is a monolithic catalytic combustion catalyst. It includes a metal support, a mixed oxide solid solution support and a catalytically active component coated on the mixed oxide support. The mixed oxide solid solution support contains a tetravalent and a pentavalent cation.

DESCRIPTION OF THE SPECIFIC EMBODIMENTS

A. Definitions

Figure 1:
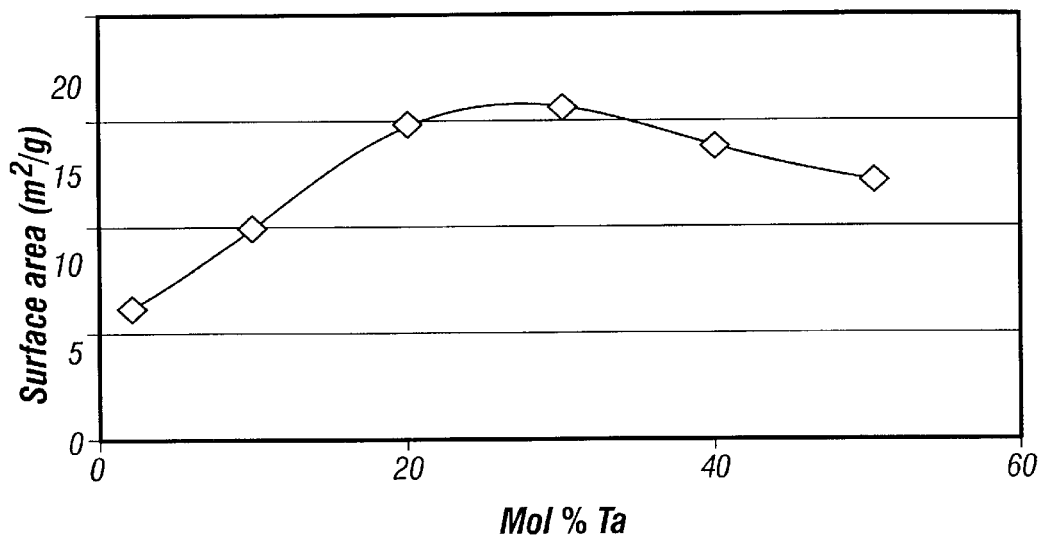
FIG. 1 is a graph showing the surface area of tantalum doped zirconia over a range of tantalum levels. The surface area was measured after heat treatment at 1035° C. in steam for 75 hours. The addition of tantalum stabilizes the surface area at all tantalum levels tested from 2 to 50 mole percent and shows a maximum in the range of 20 to 30 mole percent.

"Oxide" refers to a composition formed between an element and oxygen. The compound $ZrO_2$, for example, is an oxide. A "mixed oxide" is a composition formed between at least two elements and oxygen. The composition $TaZr_{2.75}O_8$, for example, is a mixed oxide.

"Cation" refers to a positively charged ion. A "tetravalent" cation is a cation that has an ionic charge of (+4). The cation $Zr^{<+4>}$, for example, is a tetravalent cation. A "pentavalent" cation is a cation that has an ionic charge of (+5). The cation $Ta^{<+5>}$, for example, is a pentavalent cation.

"Solid Solution" refers to a crystalline material composed of a mixture of two or more components. The ions or atoms of one component in a solid solution replace ions or atoms of the other component in its normal crystal lattice. A "single phase" solid solution is a solid solution that possesses a crystal lattice that is identical to the crystal lattice of one of its components, and the atom arrangement is uniform throughout the crystal domain.

"Monolithic Catalytic Combustion Catalyst" refers to a catalyst structure in which the entire catalyst is a single unit composed of thin walls and open spaces through which gas flows. The gas flow channels are typically arranged in a longitudinal direction, in line with the gas flow, and contain a catalyst on the wall surface for combusting a fuel. Alternatively the structure can consist of randomly ordered interconnected surfaces that allow gas flow through the structure yet provide structural strength or rigidity.

"Catalytically Active Metal" refers to a metal that increases the rate of a combustion reaction without undergoing a permanent change as the result of the reaction. Examples of catalytically active metals include, without limitation, palladium, platinum, rhodium, iridium, iron, cobalt, nickel, copper, cerium or other rare earth compounds.

"Molecularly Uniform Hydrous Oxide Gel" refers to a gel formed from two metals, M1 and M2, combined with oxide, hydroxide and water ligands in a crosslinked structure. The distribution of metal atoms is well-mixed in the structure, meaning that there are no regions where M1 or M2 are substantially concentrated.

"Supercritical Conditions" refers to reaction conditions that are above the critical temperature and pressure of a particular solvent. A "critical temperature" is the temperature above which a gas cannot be liquefied by an increase in pressure.

"Calcination" refers to a process of firing a material in moist or dry air at temperatures ranging from about 400° C. to about 1200° C. The process can decompose less stable compounds, cause the formation of more stable phases and coarsens agglomerated particles.

"Pentavalent Cation Alkoxide" refers to a composition containing a pentavalent cation and an anion of the general structure $RO^{<-1>}$, wherein the "R" group is a carbon containing moiety. The composition $Ta(OCH_2CH_3)_5$, for example, is a pentavalent cation alkoxide.

"Substrate" refers to a monolithic structure that forms the structural unit upon which the catalytically active layers are applied to form the catalytic unit. The substrate can be a ceramic structure or a metallic structure made using a variety of methods.

"Support" refers to the high surface area layer that is deposited on the surface of the substrate. The support is typically a refractory oxide or mixed oxide but can be composed of other materials.

B. Solid State Solution Oxides

Zirconia can have a number of different lattice structures consisting of an octahedral coordination of oxygen to a tetravalent Zr(+4) cation: monoclinic (natural Baddeleyite), tetragonal (stable above 1000° C.) and simple cubic (metastable or stabilized with cation substitution). It is well known that metal cations can be substituted into a zirconia lattice. The substitution of lower valence cations (e.g., yttrium (+3) and calcium (+2)) into the lattice introduces an electronic deficiency. Decreasing the number of oxygen anions (i.e., increasing anion vacancies) in the lattice compensates for the deficiency. The result is a substantial increase in oxygen ion conductance.

If, on the other hand, a higher valence cation is substituted into a zirconia lattice, the additional charge can be stabilized through an increase in oxygen anions. Additional oxygen atoms can surround the external surfaces of a small crystallite, absorbing valence electrons and increasing the coordination of oxygen anions surrounding cations that are near the surface. The crystallite is stabilized by such substitution, with the degree of stabilization being positively correlated with the ratio of surface area to bulk cation distribution.

The reconstruction of the host lattice may result if the level of cation substitution creates points of excess positive charge (EPC) at thermodynamically unstable levels. Such reconstruction can be forestalled with the formation of cation vacancies or interstitial anion vacancies. The maximum formal EPC in a bulk solid solution represents the solubility limit for the higher valent element. The level of EPC that can be, accommodated in a host lattice without recrystallization can be described as $0<EPC<\epsilon$, where $EPC= (m-n)y/(my+n(x-y))$ and $\epsilon$ is the limiting value.

Small crystallites may better accommodate EPC due to an intrinsically high ratio of surface area to volume. The addition of anions on the surface of the material could lower the energetic cost of the excess positive charge. For very small crystallites (approximately 1 nanometer), the solubility limit of the higher valent element in the oxide lattice could increase bulk limits to a higher level (e.g., >0.1).

C. Mixed Oxide Solid Solutions

The materials of the present invention are mixed oxide solid solutions that include zirconium(+4), hafnium(+4) or thorium(+4) and a pentavalent cation. Preferably, the mixed oxide solid solution includes zirconium. More preferably, the mixed oxide solid solution is a single phase solid solution that includes zirconium.

Preferably, the pentavalent cation of the mixed oxide solid solution is tantalum(+5), niobium(+5) or bismuth(+5). More preferably, it is tantalum(+5) or niobium(+5). More preferably still, the pentavalent cation is tantalum(+5).

The pentavalent cation comprises about 2 mole percent to about 70 mole percent of the mixed oxide (2% to 70% on a mole basis of total cations). Preferably, it comprises about 10 mole percent to about 50 mole percent of the mixed oxide. The pentavalent cation preferably comprises about 15 mole percent to about 35 mole percent of the mixed oxide. More preferably, it comprises about 20 mole percent to about 30 mole percent of the mixed oxide.

The mixed oxide solid solutions have surface areas greater than about 10 m²/g when heated at about 1000° C. for 10 hours in air plus water vapor. Preferably, the surface area of the materials is greater than about 15 m²/g when heated at about 1000° C. for 10 hours in air plus water vapor. More preferably, it is greater than about 20 m²/g when heated at about 1000° C. for 10 hours in air plus water vapor. More preferably still, the surface area is greater than about 25 m²/g when heated at about 1000° C. for 10 hours in air plus water vapor.

In a preferred embodiment, the mixed oxide is a single phase solid solution that includes zirconium(+4) and tantalum(+5), where the tantalum(+5) comprises about 10 mol % to about 50 mol % of the mixed oxide. The surface area of the material is greater than about 15 m²/g when heated at about 1000° C. for 10 hours in air plus water vapor. In another preferred embodiment, the mixed oxide is a single phase tantalum zirconium mixed oxide. In another preferred embodiment, the mixed oxide is a single phase $TaZr_{2.75}O_8$ solid solution, where the surface area of the material is greater than about 25 m²/g when heated at about 1000° C. for 10 hours in air plus water vapor.

D. Preparation of Mixed Oxide Solid Solutions

The mixed oxides of the present invention have high surface areas and small particle sizes. To prepare such materials, hydrous oxides are mixed at the molecular level. Sol gel synthesis is an example of a suitable method that can produce nanometer sized molecularly mixed oxide particles. See, for example, "Sol-Gel Science: The Physics and Chemistry of Sol-Gel Processing" by C. Jeffrey Brinker and George W. Scherrer (Editors), Academic Press, 1990.

Sol gel synthesis of the mixed oxides involves the following general steps: 1) a first alkoxide of zirconium, hafnium or thorium is co-dissolved with a second pentavalent cation alkoxide in a solvent to form a first solution; 2) water in an acidic solution is added to the first solution under agitation, effecting the hydrolysis of the first and second alkoxides (e.g., equations 1 and 2) and subsequent polymerization of the resulting hydroxides (e.g., equations 3 and 4). Polymerization of the hydroxides provides a gel.

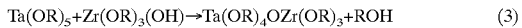
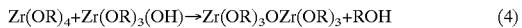

$$Zr(OR)_4 + H_2O \rightarrow Zr(OR)_3(OH) + ROH \quad (1)$$
$$Ta(OR)_5 + H_2O \rightarrow Ta(OR)_4(OH) + ROH \quad (2)$$
$$Ta(OR)_5 + Zr(OR)_3(OH) \rightarrow Ta(OR)_4OZr(OR)_3 + ROH \quad (3)$$
$$Zr(OR)_4 + Zr(OR)_3(OH) \rightarrow Zr(OR)_3OZr(OR)_3 + ROH \quad (4)$$

Preferably, in the sol gel synthesis of a mixed oxide, the hydrolysis and polymerization of the two metal alkoxides occur at about the same rates. The cross polymerization of the metal oxides occurs simultaneously with self polymerization under that scenario, forming a well-mixed oxide gel. One can adjust the rate of hydrolysis and polymerization by changing the chemical structure of the organic "R" group, a process appreciated by those of skill in the art.

The gel from the sol gel synthesis is dried to afford a porous powder. A number of methods can be used to dry the gel, including air drying, supercritical drying or supercritical solvent extraction at an elevated temperature (<300° C.). The porous powder is subjected to firing in moist or dry air at temperatures from about 400° C. to about 1200° C. This calcination procedure coarsens the agglomerated particles and burns away organic residues. The calcined materials typically have extensive macroporous (>1 μm), mesoporous (10 to 1000 nm) and microporous (<10 nm) networks.

E. Catalytic Combustion Units

The mixed oxide solid solutions of the present invention can be used, for example, as a component of a catalytic combustion unit. Such catalytic combustion units comprise two additional components: a support, to which the mixed oxide is applied; and, a catalytic component, which is incorporated into the mixed oxide. Among other things, the mixed oxide finctions as a support that stabilizes the steady-state operation of the catalytic metal during the catalysis process.

The preferred supports for the catalytic combustion unit are metallic. Where the supports are metallic, they can take a variety of forms. Such forms include honeycombs, spiral rolls of corrugated sheet, columnar or other configurations having longitudinal channels that permit a high space velocity with a minimal pressure drop or random strut or wall sections such as open cell foam like structures. The metallic supports are more malleable, more readily attached to a surrounding structure and offer lower flow resistance than many ceramic supports. (See U.S. Pat. No. 5,405,260.)

Types of metal supports that are suitable for the catalytic combustion unit include aluminum, aluminum containing or aluminum treated steels, certain stainless steels or high temperature metal alloys. Preferably, the metal support is an aluminum-containing steel, such as those discussed in U.S. Pat. Nos. 4,414,023, 4,331,631 and 3,969,082. The aluminum of these steels forms "whiskers" or crystals when oxidized that provide a rough, chemically reactive surface for better adherence of the mixed oxide solid solution.

The mixed oxide solid solution is applied to the metal support, for example, as a suspension or sol. The application can be performed using a number of techniques, including spraying the mixed oxide onto the metal support, dipping the metal support into a mixed oxide suspension, and directly applying the suspension to the metal support. After the mixed oxide suspension is applied, it is typically dried and calcined to form a high surface area catalyst support.

The catalytic metal that is incorporated into the mixed oxide support contains palladium, platinum, rhodium, iridium, iron, cobalt, nickel, copper, cerium or other rare earth compounds. It can also be a mixture of two or more of the preceding metals. The catalytic metal is added to the metal oxide in an amount sufficient to provide a desired catalytic activity without causing undue metal crystallite growth. Preferably, the metal catalyst contains palladium, where the palladium makes up between about 0.01% and 25% of the catalytic composite by weight.

The catalytic metal can be incorporated onto the mixed oxide support using a number of different procedures. The metal can be applied, for example, in a liquid carrier through spraying a solution or dispersion onto the support. The metal can be in the form of a complex, a compound or a dispersion when it is applied. Where the metal is a complex or compound, it can be water or hydrocarbon soluble. The liquid carrier can be removed from the metal by volatilization or decomposition, leaving the applied metal in a dispersed form on the support.

Where the metal catalyst contains palladium, several different compounds and complexes are suitable for the production of the catalytic metal component. Examples of such compounds and complexes include, for example, palladium chloride, palladium diammine dinitrite, palladium nitrate, palladium tetrammine chloride, sodium palladium chloride and palladium 2-ethylhexanoic acid. Preferably, nitrogen-containing palladium compounds or complexes are used to produce the catalyst.

An alternative method for adding the metal catalyst to the mixed oxide support involves the premixing of the two materials. The catalytic metal is added to the inert mixed oxide powder. The metal is fixed on the mixed oxide either by heat or chemical treatment. The resulting material is milled to form a colloidal sol and applied to a metal support by spraying, dipping, etc. (See U.S. Pat. No. 5,405,260).

After the mixed oxide solid solution and the catalytic metal have been applied to the metallic support and calcined, one or more coatings of a refractory oxide can optionally be applied on the outer surface of the catalyst containing layer to act as a barrier to diffusion of gaseous species into the active catalyst layer. The refractory oxide coating can be, for example, silica, zirconia, titania or a number of other oxides that exhibit low catalytic activity for fuel oxidation. The coating can be as thin as 1% of the mixed oxide support thickness or substantially thicker than the mixed oxide support. Preferably the refractory oxide coating thickness is about 10% to about 100% of the mixed oxide support thickness. The coating can be applied through the same types of procedures as used to apply the mixed oxide support.

The mixed oxide solid solution, metal catalyst, and optional refractory oxide coating can be applied to all surfaces of a catalyst support or only to a surface opposite to a non-coated surface. A spiral corrugated structure, for instance, can be coated on one side and then rolled into a monolith. During catalysis, such a structure provides for the conduction of heat from the catalytic metal surface to an adjacent, noncatalytic surface. This integral heat exchange allows the temperature of the catalyst surface to be controlled without resorting to measures such as air dilution or extraneous heat exchange structures.

The size and configuration of the catalyst structure should provide for an average linear gas velocity through its longitudinal channels greater than about 0.5 meters per second and less than about 50 meters per second. The lower limit is greater than the flame front speed for methane, while the upper limit is a practical one for typical, commercially available supports. Where the fuel is not methane, the average gas velocities may vary.

F. Combustion Processes

The fuel is typically mixed into combustion air such that a mixture having an adiabatic combustion temperature greater than the temperature of the process is produced. The adiabatic combustion temperature is the temperature that the gas mixture would reach when the fuel-air mixture is fully combusted without the loss of any of the reaction heat. Preferably, the adiabatic combustion temperature of the mixture is greater than about 900° C. It is more preferably greater than about 1000° C. Non-gaseous fuels should be at least partially vaporized prior to contact with the combustion catalyst unit. The combustion process can operate at a pressure between about 0.25 atm and about 35 atm. Preferably, the process operates between about 3 atm and about 25 atm.

Suitable fuels for the combustion process can be either liquid or gaseous at room temperature and pressure. Most carbonaceous fuels that are vaporized at the combustion process temperature, however, are suitable. Examples of such fuels include the following: methane, ethane, propane, butane, pentane, hexane, heptane and octane and mixtures of these (e.g., pipeline natural gas, which is generally a mixture of methane, smaller concentrations of longer chain hydrocarbons up to about $C_{10}$, and small concentrations of inert gases such as nitrogen and carbon dioxide); gasoline; aromatic hydrocarbons such as benzene, toluene, ethylbenzene and xylene; naphthas; diesel fuel and kerosene; jet fuels; other middle distillates; heavier fuels (preferably hydrotreated to remove nitrogenous and sulfurous compounds); alcohols such as methanol, ethanol, isopropanol and butanol; ethers such as diethylether, ethyl phenyl ether, MTBE; and other oxygenated fuels. Low BTU gases such as town gas or syngas can also be used as fuels, including gas streams that contain large concentrations of hydrogen. (See U.S. Pat. No. 5,405,260.)

The fuel/air mixture supplied to the catalyst should be well mixed. The gas inlet temperature can be varied depending on the nature of the fuel. The gas inlet temperature can be achieved by preheating the gas through heat exchange or by adiabatic compression such as occurs in a gas turbine. In addition, the gas temperature can be further increased by combustion of a small portion of the fuel in a conventional flame burner just upstream of the catalytic system.

The bulk outlet temperature of the partially combusted gas leaving the portion of the unit containing the catalyst, and the catalyst substrate temperature within the catalytic unit, may be significantly lower than the adiabatic or autocombustive temperature of the gas. Typically, the temperatures within the catalyst will be less than about 1000° C. It is preferable that the catalyst temperature not exceed 950° C.

The following examples are illustrative and are not meant to limit the present invention.

EXAMPLES

Example 1

A Ta—Zr mixed oxide containing 20 mol % Ta was prepared as follows. 375 μL (micro liters) of nitric acid (70 wt %) was added to 2.25 g distilled water and 15 ml of anhydrous 1-propanol. In a water vapor free glove box or chamber, separate solutions of zirconium n-propoxide and tantalum ethoxide were prepared. The zirconium n-propoxide solution was prepared by adding 7.5 g of zirconium n-propoxide (Aldrich, 70 wt % in 1-propanol) to 75 ml of anhydrous n-propanol. The tantalum ethoxide solution was prepared by adding 1.62 g of tantalum ethoxide (Aldrich) to 23 g of anhydrous n-propanol. A 1 liter glass liner vessel was placed in the glove box and the zirconium n-propoxide and tantalum ethoxide solutions were added to this vessel with magnetic stirring. The 1 liter glass autoclave liner was covered and removed from the glove box and, with vigorous stirring, the n-propanol-water-nitric acid solution was added. Stirring was continued until the stirrer could no longer produce a vortex, at which point the mixture was considered gelled. The gel was covered and aged for 16 hours at room temperature.

The gel was then dried as follows. The glass liner containing the gel was placed in a 1 liter autoclave and 220 ml of n-propanol added. The autoclave was closed and purged with nitrogen. The purge was stopped, the vent closed and the autoclave heated to 300° C. at 3 C/min. The temperature was held at 300 C for 15 minutes and the pressure was slowly vented through a cooled condenser at a rate that would collect 10 ml of solvent per minute. After the autoclave pressure reached zero gauge pressure, the temperature was reduced, the autoclave purged with nitrogen and the powder removed from the autoclave.

Example 2

A Ta—Zr mixed oxide containing 20 mol % Ta was prepared as follows. 3 drops of nitric acid (70 wt %) was added to 40 ml distilled water. In a nitrogen purged glove box, 1.6 g tantalum ethoxide (Aldrich) and 8 g of zirconium n-propoxide (Aldrich, 70 wt % in 1-propanol) were mixed in 15 ml of 1-propanol. The mixture was placed in a separatory funnel and then removed from the glove box. The tantalum-zirconium solution was added to the nitric acid solution at a rate of 2 drops per minute with vigorous agitation. A fine white precipitate was formed as the tantalum zirconium solution contacted the nitric acid solution. After the addition was complete, the slurry was stirred for 30 minutes, filtered and washed with two 100 ml aliquots of distilled water and 100 ml of anhydrous ethanol. The solid was dried overnight at 110 C in air.

Example 3

An impregnated Ta on pre-prepared zirconium oxide was prepared as follows. 5 grams of zirconia (DKK Japan, RC-100P) was lightly ground with a mortar and pestle. 3.3 g of tantalum ethoxide was added rapidly to the zirconia powder and kneaded using a ceramic spatula to form a dry powder. The impregnated powder was exposed to water vapor saturated air for 24 hours then dried overnight at 110 C.

Example 4

The mixed oxide materials prepared in Examples 1–3 were tested for thermal stability by heat treating them for 10 hours at 400 C in air, 10 hours at 1000 C in air and 75 hours at 1035 C in air with 10% steam. The surface area of the resulting powder was measured by nitrogen adsorption using the BET method to give the data shown in Table 1. In addition to the materials prepared in Examples 1 through 3, the DKK $ZrO_2$ was heat treated to show the thermal stability of pure $ZrO_2$.

TABLE 1

Heat Treatment of $ZrO_2$ and Ta-$ZrO_2$

| Description | | | Surface area (m²/g) | | |
|---|---|---|---|---|---|
| | | | 400° C. air | 1000° C. air | 1035° C. air + steam |
| DKK $ZrO_2$ | | | — | 46 | 6.7 | 4.3 |
| 20% Ta-$ZrO_2$ | Sol gel | Example 1 | 220 | 28.4 | 15.0 |
| 20% Ta-$ZrO_2$ | co-precip-itated | Example 2 | 125 | 12.7 | 7.8 |
| 20% Ta-$ZrO_2$ | Impreg-nation | Example 3 | 81 | 8.0 | 4.0 |

The commercial DKK $ZrO_2$ showed severe sintering, with the measured BET surface area dropping to 6.7 m²/g at 1000 C in air and to 4.3 m²/g at 1035 C in air plus steam. The 20% Ta—$ZrO_2$ prepared by the procedure of Example 1 retained a surface area of 28.4 m²/g at 1000 C and 15.0 m²/g at 1035 C plus steam. The same composition but prepared by the more conventional co-precipitation techniques or by Ta impregnation of a preformed $ZrO_2$ showed high initial surface area but sintered rapidly to values similar to those for $ZrO_2$.

Example 5

A series of samples were prepared with varying levels of Ta from 2.3 mole percent to 50 mole percent using the same procedure as in Example 1. The quantities of materials used are shown in Table 2.

TABLE 2

Parameters used in preparing sol-gels.
Sol Gel Parameters

| Example No. | Ta content Mole % Ta | Zr(OPr)₄³/PrOH (grams/ml total) | Ta(OEt)₄/PrOH (grams/ml total) | H₂O/PrOH (grams/ml total) | HNO₃ (Conc.) (µL) | Gel time (min) |
|---|---|---|---|---|---|---|
| 5A | 0 | 8/100 | — | 8/20 | 325 | 90 |
| 5B | 2.3 | 8/80 | 0.164/20 | 2.0/15 | 325 | 90 |
| 5C | 10 | 8/80 | 0.8/20 | 2.1/15 | 375 | 90 |
| 1 | 20 | 7.5/75 | 1.62/25 | 2.25/15 | 375 | 30 |
| 5D | 30 | 7.5/75 | 2.79/25 | 2.65/15 | 375 | 20 |
| 5E | 40 | 7.5/75 | 4.34/25 | 3.1/25 | 375 | N/A |
| 5F | 50 | 7.5/75 | 6.5/25 | 3.9/25 | 375 | N/A |

Opr = Propanol ligand, OEt = Ethanol ligand, PrOH = 1-propanol,
"N/A" indicates the information was "not available."
ªZr(Opr)4 70 wt % in PrOH

Example 6

The mixed oxide samples of Example 5, which were prepared by the sol-gel process and supercritical drying, were heat treated in a similar manner as in Example 4 above. Table 3 shows the data obtained from the heat treatment experiments. The data are graphically represented in FIG. 1.

TABLE 3

Heat treatment of Ta-ZrO with varying Ta levels.

| | | Surface area (m²/g) | | |
|---|---|---|---|---|
| Description | | 400° C. air | 1000° C. air | 1035° C. air + stream |
| ZrO | Example 5A | 157 | 14 | |
| 2.3% Ta-$ZrO_2$ | Example 5A | — | 16.5 | 6.2 |
| 10% Ta-$ZrO_2$ | Example 5B | 163 | 21.0 | 10.0 |
| 20% Ta-$ZrO_2$ | Example 1 | 220 | 28.4 | 15.0 |
| 30% Ta-$ZrO_2$ | Example 5C | 237 | 28.6 | 15.8 |
| 40% Ta-$ZrO_2$ | Example 5D | 231 | 28.4 | 14.0 |
| 50% Ta-$ZrO_2$ | Example 5E | 236 | 21.0 | 12.4 |

Example 7

A series of Niobium stabilized ZrO2 materials were prepared using the same procedure as in Example 1. The Niobium contents were 2.1, 10 and 20 mole percent of Niobium in ZrO2 (mole percent of Nb+Zr). The solution compositions were as shown in Table 4a. These materials were heat treated using the procedures described in Example 4. the resulting measured surface areas are given in Table 4b.

TABLE 4a

Solution compositions.

| Example No. | Nb content Mole % Ta | $Zr(OPr)_4$/PrOH (grams/ml total) | $Nb(OEt)_5$/PrOH (grams/ml total) | $H_2O$/PrOH (grams/ml total) | $HNO_3$ (Conc.) (L) |
|---|---|---|---|---|---|
| 7A | 2.1 | 8/80 | 0.12/20 | 2.0/15 | 325 |
| 7B | 10 | 8/80 | 0.63/20 | 2.1/15 | 375 |
| 7C | 20 | 7.5/75 | 1.27/25 | 2.25/15 | 375 |

OPr = propanol ligand, OEt = ethanol ligand, PrOH = 1-propanol.
$Zr(OPr)_5$ is 70 weight percent in PrOH.

TABLE 4b

Heat treatment of Nb—$ZrO_2$ with varying Nb levels.

| | | Surface area (m²/g) | | |
|---|---|---|---|---|
| Description | | 400 C. air | 1000 C. air | 1035 C. air + steam |
| 2.1% Nb—$ZrO_2$ | Example 7A | nm | 13.4 | 6.2 |
| 10% Nb—$ZrO_2$ | Example 7B | nm | 15.3 | 7.8 |
| 20% Nb—$ZrO_2$ | Example 7C | nm | 15.0 | 8.4 | nm = not measured

Example 8

4.1 g of Ta—$ZrO_2$ from Example 1, calcined in air at 1000° C. for 10 hours, was ground with a mortar and pestle, mixed with 70 ml of distilled water and sulfuric acid was added to adjust the pH to ~4. It was treated in an ultrasonic bath for 30 minutes, resulting in a slurry that was stable to settling for periods of 10 to 20 minutes.

A Fe/Cr/Al metal foil of 3 inch width was corrugated in a herringbone pattern and oxidized at 900° C. in air to form an alumina coating on the surface of the metal. The Ta—$ZrO_2$ slurry was sprayed onto one side of the corrugated metal foil, and the foil was dried and calcined at 1000° C. for 10 hours. The final loading of Ta—$ZrO_2$ on the foil was 6.0 mg/cm² of foil. $Pd(NH_3)_2(NO_2)_2$ salt was dissolved in nitric acid to produce a solution with a concentration of 0.20 g Pd/ml. This solution was sprayed onto the coated foil. The foil was dried and calcined in air at 1000° C. for 10 hours. The final loading of Pd was 0.9 mg Pd/cm² of foil. The coated corrugated foil was then rolled so that the corrugations on the foil did not mesh, forming a final metal structure of two inch diameter and 3 inch length with longitudinal channels running axially through the structure.

Example 9

The catalyst of Example 8 was placed in a two inch I.D. insulated section of a combustion test apparatus. Air was passed through a heater, a static gas mixer and then through the catalyst. The air flow was adjusted to a flow rate of 4210 standard liters per minute (SLPM) and the pressure inside the test apparatus adjusted to 9.4 atmospheres absolute. Natural gas was introduced just upstream of the static mixer, producing a very well mixed fuel air mixture at the catalyst inlet. Gas temperatures were measured before and after the catalyst by thermocouples suspended in the gas stream.

Figure 2:
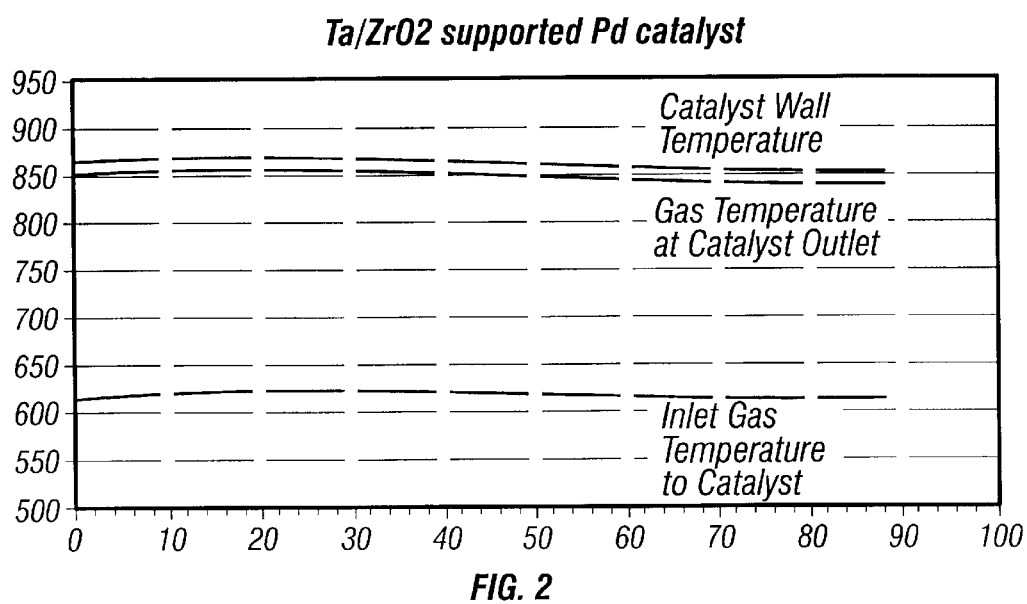
FIG. 2 is a graph showing the performance of a Pd/Ta—$ZrO_2$ catalyst during the catalytic combustion of natural gas over the course of 90 hours. The test was run under typical gas turbine catalytic combustion conditions of gas flow, fuel air ratio, pressure and temperature (see body of specification). The ability of the catalyst to combust the fuel in the fuel air mixture shows that it is a good catalyst for catalytic combustion. The nearly constant value of the catalyst wall temperature and the gas temperature at the catalyst outlet demonstrates that the catalyst has good stability.

Natural gas at 180 SLPM was introduced into the air stream and the air temperature increased to 620° C. The natural gas fuel reacted on the catalyst and produced an outlet gas temperature of approximately 860° C. This catalyst was operated for 90 hours and showed stable performance over this period. The performance is shown in FIG. 2. These data show that the catalytic activity of Pd supported on Ta—$ZrO_2$ is stable with time.

Examples 10A Through 10C

10A. Material prepared according to Example 3 was calcined in a muffle furnace at 800° C. for 10 hours.

10B. Material from Example 10A was calcined at 1035° C. in air plus 10% water vapor for 75 hours.

10C. Material from Example 1 was calcined in air at 800° C. for 10 hours.

Figure 3:
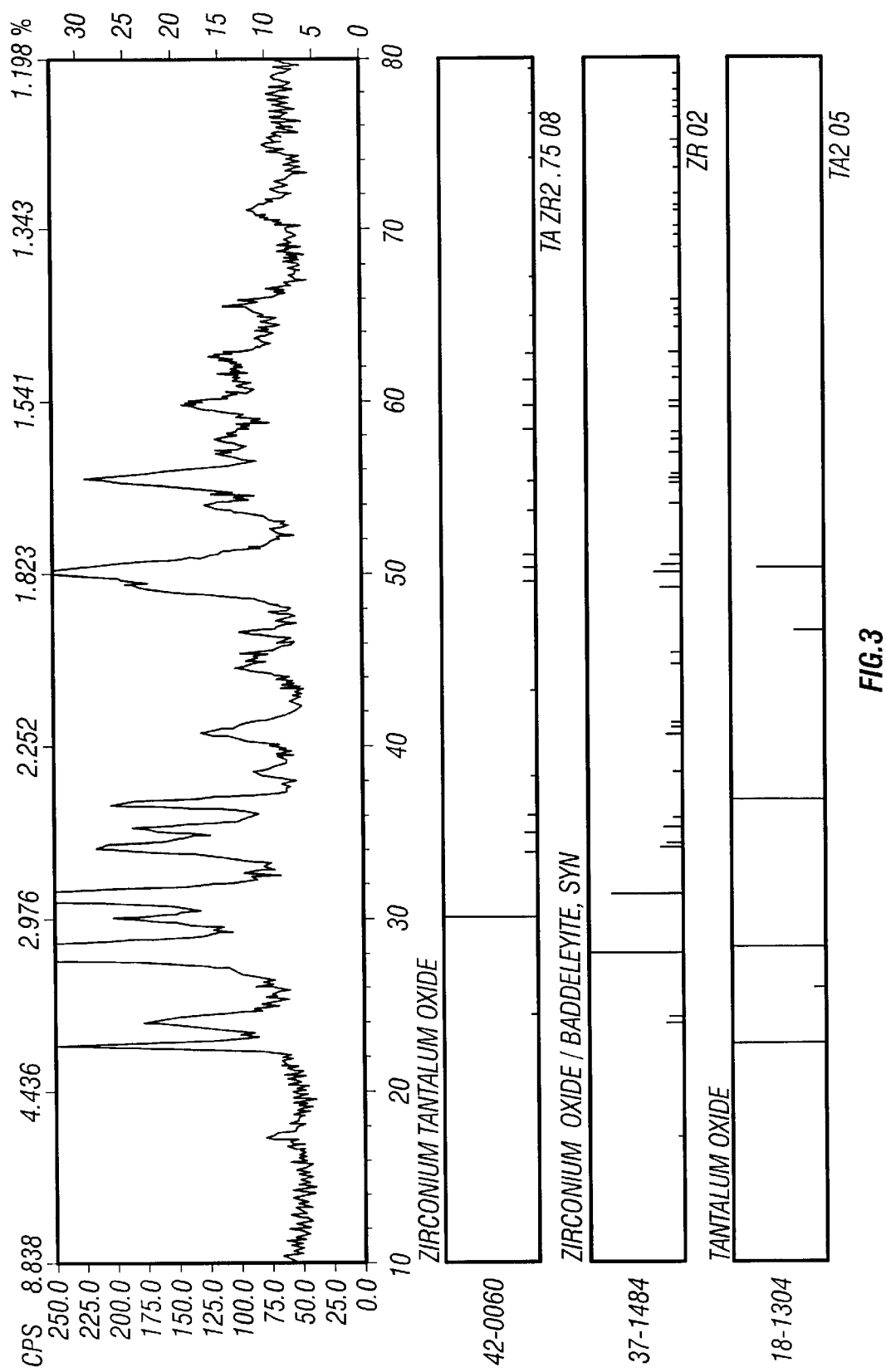
FIG. 3 is an X-ray diffraction spectrum of 20 mole percent Ta—Zr mixed oxide prepared in Example 10A. The method of Example 3 was used to prepare an impregnated Ta on previously prepared $ZrO_2$ and subsequently treated at 800° C. in air. The diffraction pattern is consistent with major phases of $ZrO_2$ and $Ta_2O_3$ and only a minor amount of zirconium tantalum oxide ($TaZr_{2.75}O_8$).
Figure 4:
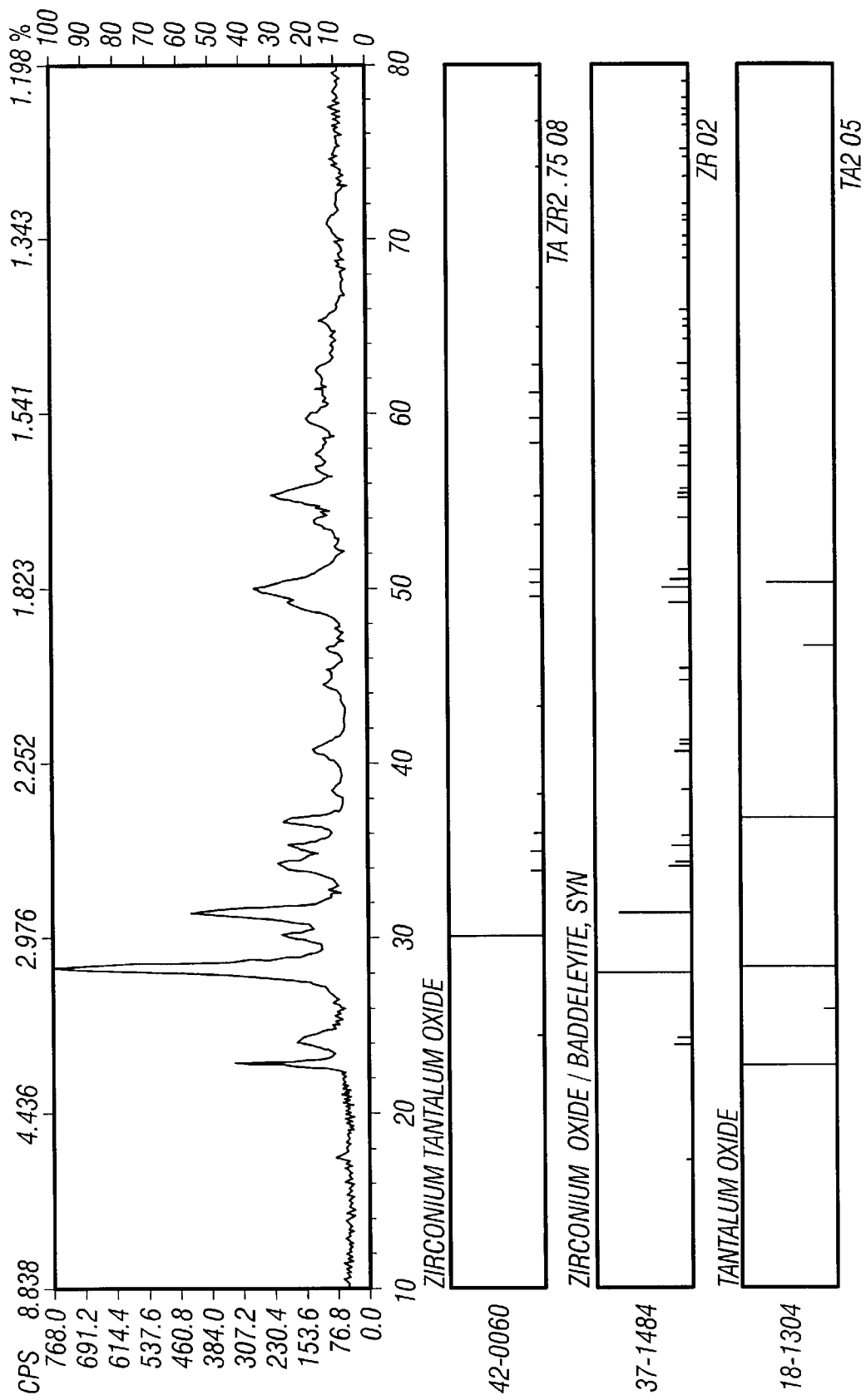
FIG. 4 is the x-ray diffraction pattern of FIG. 3 but with the major peak set to full scale.

FIGS. 3 and 4 give the X-Ray Diffraction (XRD) pattern for the material of Example 10A. FIG. 4 displays the XRD spectrum with the largest diffraction peak shown at full scale, while FIG. 3 shows an expanded scale to emphasize the minor diffraction peaks. The XRD pattern shows the material to consist of a mixture of three compounds: Zirconium oxide ($ZrO_2$), Tantalum Oxide ($Ta_2O_5$) and a small amount of Zirconium Tantalum Oxide ($TaZr_{2.75}O_8$). This shows that impregnation of a tantalum compound (tantalum oxide) onto the surface of a preformed zirconium oxide and heating to 800° C. results in the formation of predominately separate phases of zirconium oxide and tantalum oxide. Only minor amounts of the tantalum-zirconium solid solution are formed.

Figure 5:
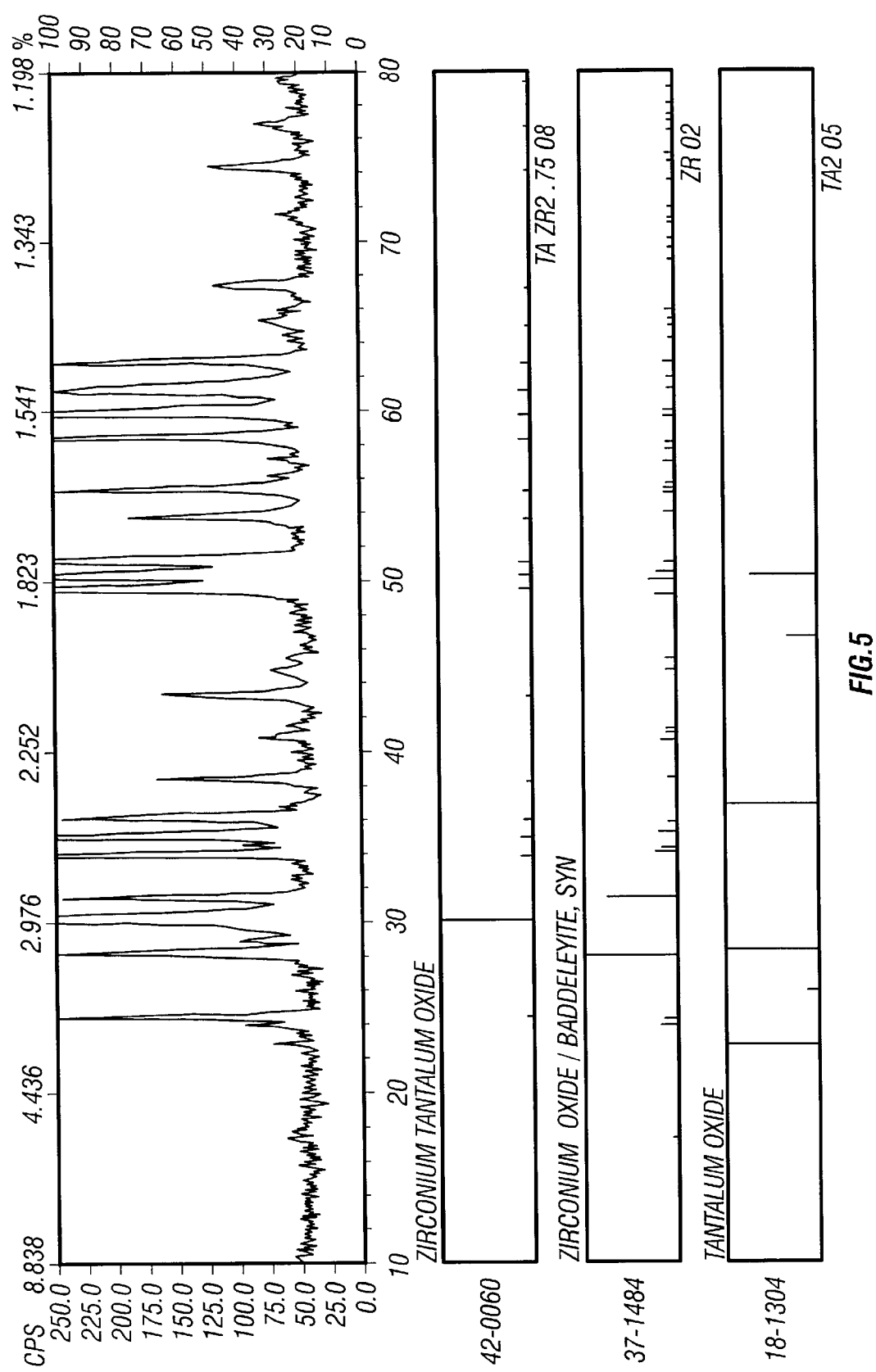
FIG. 5 is an X-ray diffraction spectrum of 20 mole percent Ta—Zr oxide prepared in Example 10B, which took the material of Example 10A and subsequently heat treated it at 1035° C. for 75 hours in 10% water vapor. The diffraction pattern is consistent with zirconium tantalum oxide ($TaZr_{2.75}O_8$) being the major phase.
Figure 6:
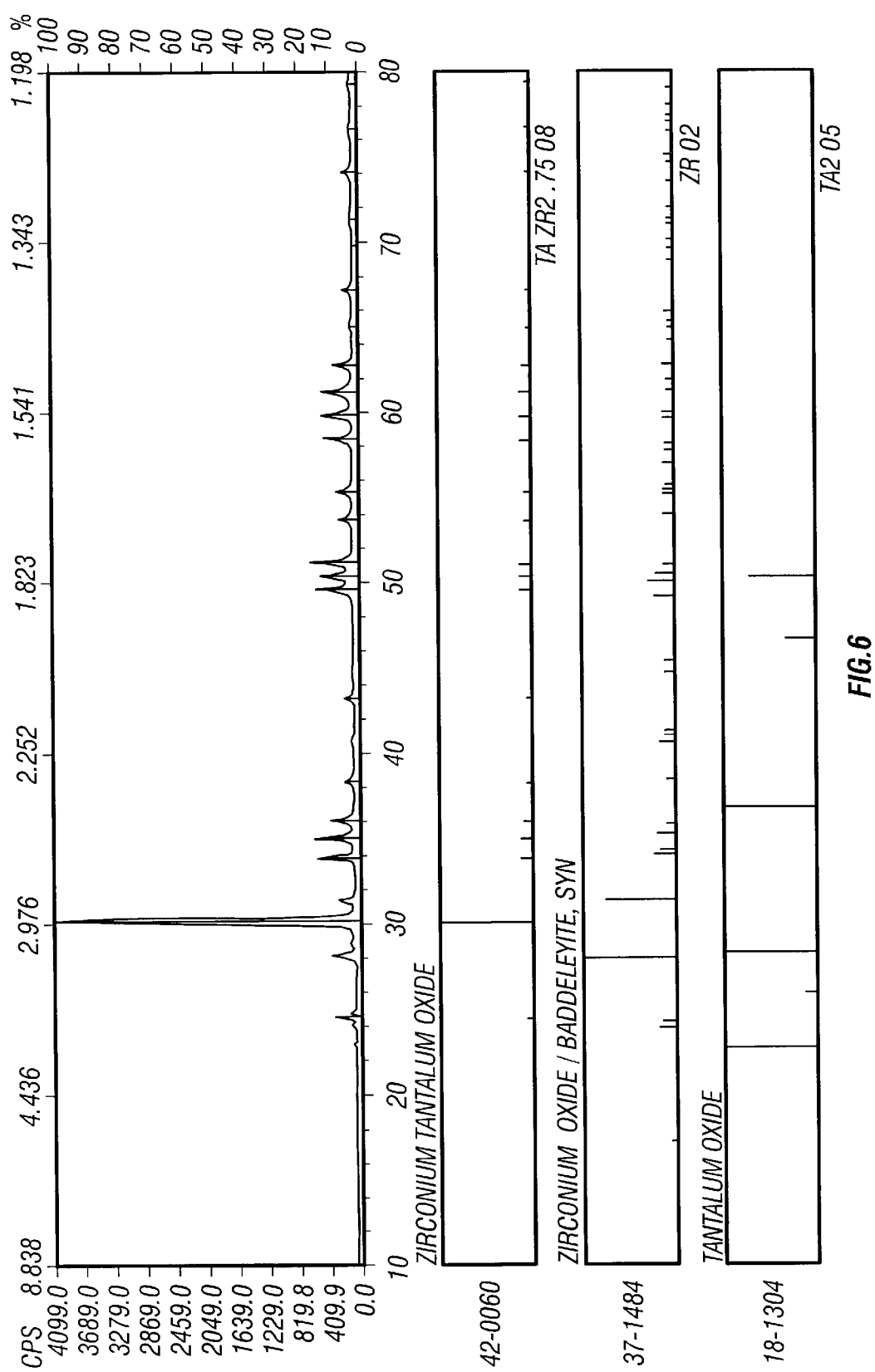
FIG. 6 is the X-ray diffraction pattern of FIG. 5 but with the major peak set to full scale.

When this material is heated to 1035° C. for 75 hours, Example 10B, it is almost completely converted to Zirconium Tantalum Oxide (TaZr$_{2.75}$O$_8$) as shown in FIGS. 5 and 6 (again with FIG. 6 displaying the XRD spectrum with the largest diffraction peak shown at full scale, while FIG. 5 shows an expanded scale to emphasize minor diffraction peaks). The Ta$_2$O$_5$ is essentially absent and there are minor amounts of ZrO$_2$. The major phase is TaZr$_{2.75}$O$_8$ solid solution. At the high temperature of 1035° C. and long times, the separate phases of tantalum oxide and zirconium oxide react to form the solid solution TaZr$_{2.75}$O$_8$, but in this process the material loses its surface area as shown in Table 1.

Figure 7:
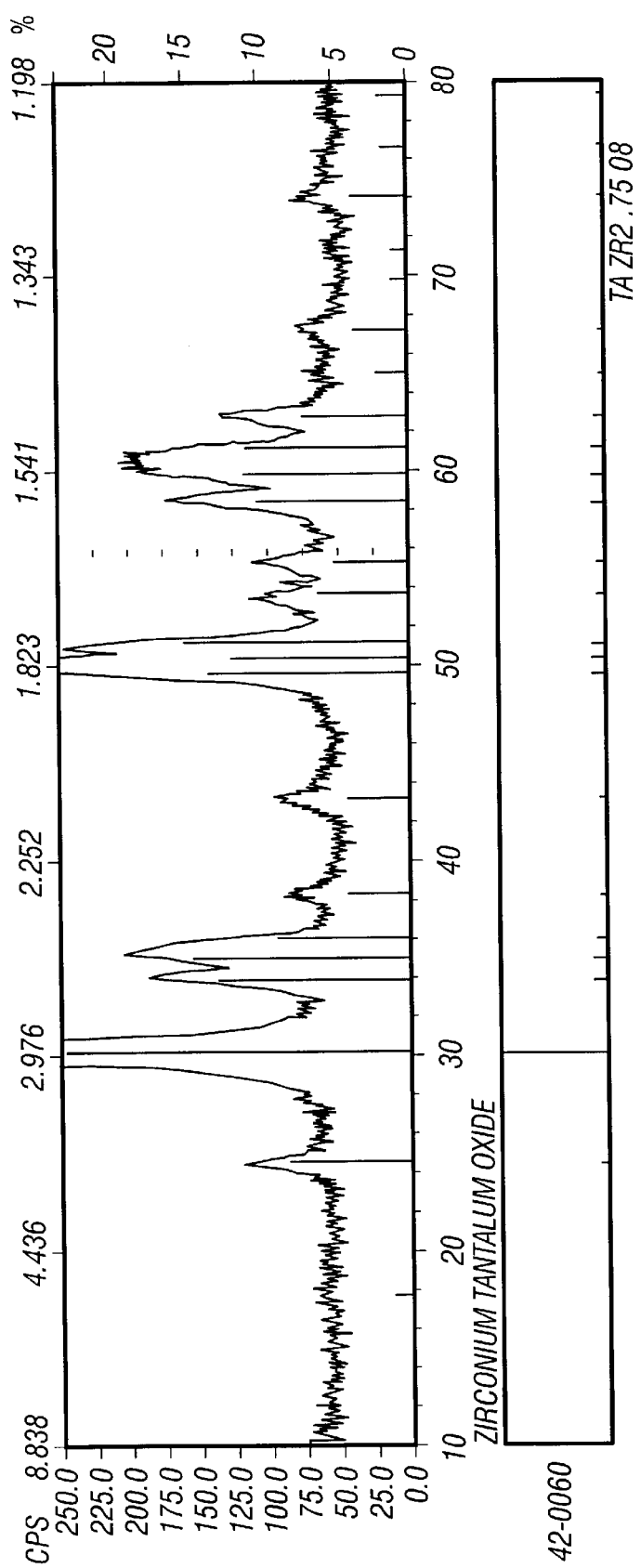
FIG. 7 is an X-ray diffraction spectrum of 20 mole percent Ta—Zr mixed oxide prepared in Example 1 and subsequently heat treated at 800° C. in air for 10 hours. This diffraction pattern is consistent with a single phase of tantalum zirconium oxide ($TaZr_{2.75}O_8$) with no trace of either $ZrO_2$ or $Ta_2O_3$.
Figure 8:
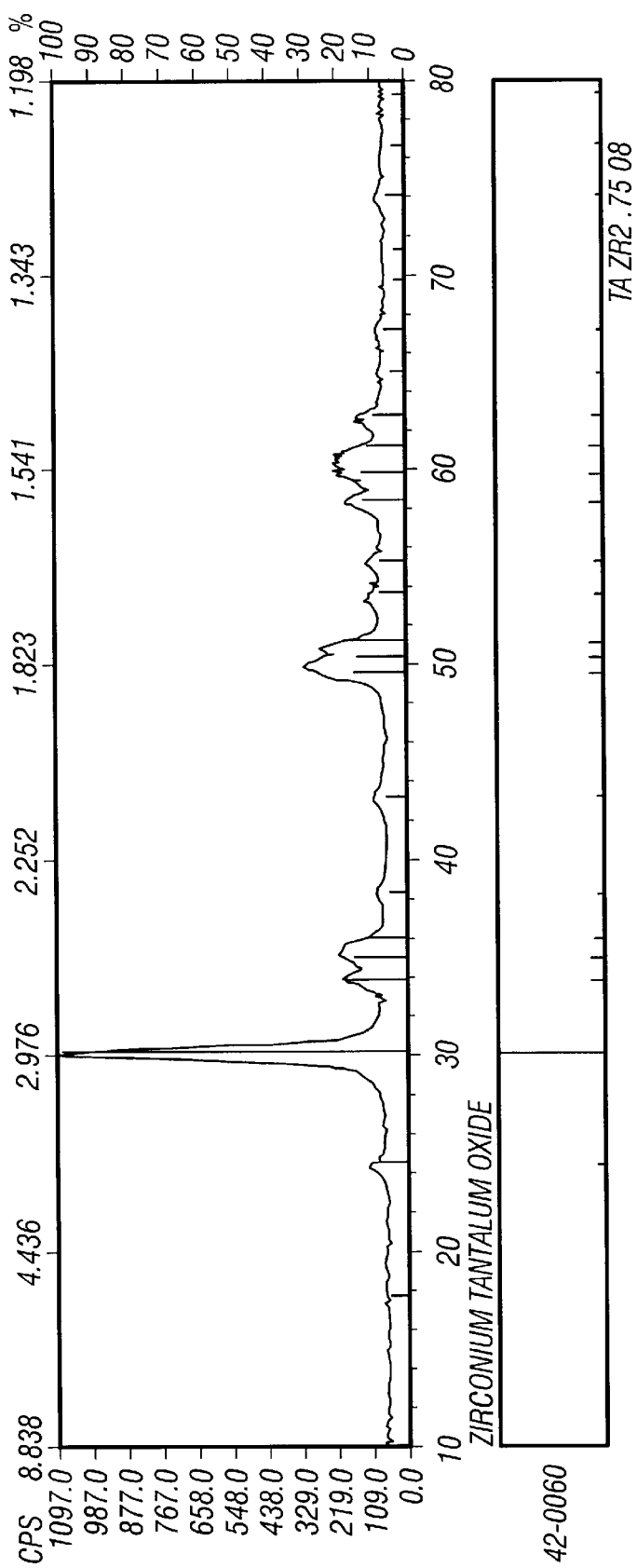
FIG. 8 is the X-ray diffraction pattern of FIG. 5 but with the major peak set to fall scale.

The XRD spectrum of the material from Example 10C is shown in FIGS. 7 and 8. FIG. 8 displays the XRD spectrum with the largest diffraction peak shown at full scale, while FIG. 7 shows an expanded scale to emphasize the minor diffraction peaks. When the material of Example 1 is calcined at 800° C. for 10 hours in air, Example 10C, the material is a single phase material consisting of (TaZr$_{2.75}$O$_8$) even though the calcination temperature is only 800° C. This shows that when a tantalum zirconium material is prepared by the method of this disclosure, the solid solution is formed at low temperature. This can be directly compared to the material of Example 10A (procedure of Example 3) that when heated to 800° C. still retains the separate oxide phases. This is summarized in Table 5, below.

TABLE 5

Comparison of the X-ray diffraction phase composition of a tantalum zirconium mixed oxide prepared by the method of the present invention and comparison materials prepared by alternative methods.

| Sample | Description | Calcination temp | Phases | amount |
|---|---|---|---|---|
| 10A | Impregnation | 800° C. | Ta$_2$O$_5$ | Major |
|  |  |  | ZrO$_2$ | Minor |
|  |  |  | TaZr$_{2.75}$O$_8$ | Trace |
| 10B | Impregnation | 1035° C. | TaZr$_{2.75}$O$_8$ | Major |
|  |  |  | ZrO$_2$ | Minor |
|  |  |  | Ta$_2$O$_5$ | Trace |
| 10C | Sol gel + supercritical drying | 800° C. | TaZr$_{2.75}$O$_8$ | Single phase |

The scientific publications, patents or patent applications cited in the various sections of this document are herein incorporated-by-reference for all purposes.

What is claimed is:

1. A monolithic catalytic combustion catalyst comprising:
a metal support;
a mixed oxide support comprising a pentavalent cation and a member selected from the group consisting of zirconium, hafnium and thorium, wherein the mixed oxide support has a surface area of greater than about 10 m$^2$/g at 1000° C. in air coated on the metal support; and,
a catalytically active component coated on the mixed oxide support.

2. A monolithic catalytic combustion catalyst according to claim 1, wherein the mixed oxide support comprises zirconium.

3. A monolithic catalytic combustion catalyst according to claim 2, wherein the pentavalent cation is tantalum, and wherein tantalum comprises about 2 mole percent to about 70 mole percent of the mixed oxide.

4. A monolithic catalytic combustion catalyst according to claim 2, wherein the metal support is a corrugated foil.

5. A monolithic catalytic combustion catalyst according to claim 2, wherein the catalytically active component is palladium.

6. A monolithic catalytic combustion catalyst according to claim 5, wherein the mixed oxide support comprises a single phase solid solution.

7. A monolithic catalytic combustion catalyst according to claim 6, wherein the single phase solid solution is TaZr$_{2.75}$O$_8$.

8. A monolithic catalytic combustion catalyst according to claim 7, wherein the metal support is a Fe/Cr/Al or Ni/Cr/Al metal foil, and wherein the single phase TaZr$_{2.75}$O$_8$ solid solution is a single phase material having the X-ray diffraction structure depicted in FIG. 8.

9. A monolithic catalytic combustion catalyst according to claim 1, wherein the pentavalent cation comprises tantalum.

10. A monolithic catalytic combustion catalyst according to claim 1, wherein the pentavalent cation comprises niobium.

11. A monolithic catalytic combustion catalyst according to claim 1, wherein the mixed oxide support is about 2 mole percent to about 70 mole percent tantalum.

12. A monolithic catalytic combustion catalyst according to claim 1, wherein the mixed oxide support is about 10 mole percent to about 50 mole percent tantalum.

13. A monolithic catalytic combustion catalyst according to claim 1, wherein the mixed oxide support is a solid solution.

14. A monolithic catalytic combustion catalyst according to claim 13, wherein the solid solution is substantially a single phase solid solution.

15. A monolithic catalytic combustion catalyst according to claim 14, wherein the single phase solid comprises TaZr$_{2.75}$O$_8$.

16. A monolithic catalytic combustion catalyst according to claim 15, wherein the single phase TaZr$_{2.75}$O$_8$ solid solution is a single phase material having the X-ray diffraction structure depicted in FIG. 8.

* * * * *